(12) United States Patent
Eriksson

(10) Patent No.: US 7,853,507 B2
(45) Date of Patent: Dec. 14, 2010

(54) METHOD FOR ORGANIZING FINANCIAL INSTRUMENTS IN A CSD-SYSTEM

(75) Inventor: Johan Eriksson, Stockholm (SE)

(73) Assignee: OMX Technology AB, Stockholm (SE)

( * ) Notice: Subject to any disclaimer, the term of this patent is extended or adjusted under 35 U.S.C. 154(b) by 1747 days.

(21) Appl. No.: 10/601,199

(22) Filed: Jun. 23, 2003

(65) Prior Publication Data

US 2004/0267653 A1    Dec. 30, 2004

(51) Int. Cl.
*G06Q 40/00*    (2006.01)

(52) U.S. Cl. .................................................. 705/36 R

(58) Field of Classification Search ...................... None
See application file for complete search history.

(56) References Cited

U.S. PATENT DOCUMENTS

| | | | |
|---|---|---|---|
| 5,327,559 A * | 7/1994 | Priven et al. ................. | 718/101 |
| 5,918,052 A * | 6/1999 | Kruskal et al. .............. | 717/100 |
| 5,930,778 A * | 7/1999 | Geer ........................... | 705/45 |
| 5,987,423 A | 11/1999 | Arnold et al. | |
| 6,115,719 A | 9/2000 | Purdy et al. | |
| 6,134,706 A | 10/2000 | Carey et al. | |
| 6,141,658 A | 10/2000 | Mehr et al. | |
| 6,278,981 B1 * | 8/2001 | Dembo et al. ............. | 705/36 R |
| 6,366,922 B1 * | 4/2002 | Althoff ................... | 707/103 R |
| 6,513,152 B1 | 1/2003 | Branson et al. | |
| 6,564,209 B1 | 5/2003 | Dempski et al. | |
| 6,691,282 B1 * | 2/2004 | Rochford et al. ............ | 715/234 |
| 7,177,839 B1 * | 2/2007 | Claxton et al. ................ | 705/44 |
| 2001/0005888 A1 * | 6/2001 | Abdelkrim ................... | 713/200 |
| 2001/0025264 A1 | 9/2001 | Deaddio et al. | |
| 2001/0044766 A1 * | 11/2001 | Keyes .......................... | 705/36 |
| 2002/0073078 A1 * | 6/2002 | Ku et al. ........................ | 707/3 |

(Continued)

FOREIGN PATENT DOCUMENTS

JP    10198735    7/1998

(Continued)

OTHER PUBLICATIONS

Discosure Framework for Securities Settlement Systems; http://web.archive.org/web/*/http://www.bis.org/publ/cpss20r11.pdf; Oct. 3, 2000; pp. 1-3.*

(Continued)

*Primary Examiner*—Hani Kazimi
*Assistant Examiner*—Virpi H Kanervo
(74) *Attorney, Agent, or Firm*—Nixon & Vanderhye P.C.

(57) ABSTRACT

A computerized CSD-system includes an instruments register in which the instruments have attributes which define them. The instruments are configured in a hierarchical multi-level structure. A first instrument on a first level in the hierarchy is linked to instruments on a second, lower level in the hierarchy. The link between instruments on the first and second levels of the hierarchy is defined by all of the attributes in the instruments on the second level also included in the instrument on the first level to which the instruments on the second level are linked. An amendment to an attribute in an instrument causes the same amendment in the same attribute of those instruments which are linked to the amended instrument and which are on lower levels in the hierarchy than the amended instrument. Each instrument is only allowed a link to one instrument above it.

15 Claims, 5 Drawing Sheets

U.S. PATENT DOCUMENTS

| | | | |
|---|---|---|---|
| 2002/0078115 A1* | 6/2002 | Poff et al. | 709/1 |
| 2002/0091621 A1* | 7/2002 | Conklin et al. | 705/37 |
| 2003/0110112 A1* | 6/2003 | Johnson et al. | 705/36 |
| 2003/0172192 A1* | 9/2003 | Carey et al. | 709/315 |
| 2004/0216087 A1* | 10/2004 | Wilson et al. | 717/116 |
| 2004/0236668 A1* | 11/2004 | Toffey | 705/37 |
| 2005/0209940 A1* | 9/2005 | Lea et al. | 705/35 |

FOREIGN PATENT DOCUMENTS

| | | |
|---|---|---|
| JP | A-2001-92879 | 4/2001 |
| JP | A-2003-30213 | 1/2003 |

OTHER PUBLICATIONS

Rankin, Daniel; Ready for Boom or bust at CDS; Computing Canada, Willowdale; Nov. 24, 1997; vol. 23, Iss. 24; 2 pgs.*

Anonymous; Bond Investor Protection Fund Eyed in Japan; Jiji Press English News Service, Tokyo; Jan. 8, 2002; 1 pg.*

Anonymous; Exchange-America, LLC and DTCC's Annuity Application Process Goes Live with Well Fargo Investments, LLC and Major Carriers; PR Newswire, New York; Jun. 26, 2001; 1 pg.*

Anonymous; China Sets Up Securities Clearing Co.; Xinhua News Agency—CEIS, Woodside; Mar. 30, 2001, 1 pg.*

Australian Search Report mailed Aug. 25, 2006 in corresponding Singapore patent application No. 200507472-9.

Translation of Japanese official action, Sep. 25, 2009, in corresponding Japanese Application No. 2006-515969.

http://www.ipo.go.ip/shiryou/kijun/kijun2/pdf/tt1212-045_7-1.pdf.

http://www.jpo.go.jp/tetuzuki/t_tokkyo/bijinesu/tt1303-090_kouhyo.htm.

http://www.jpo.go.jp/tetuzuki/t_tokkyo/bijinesu/biz_pat_case.htm.

Translation of Decision of Rejection, Mar. 19, 2010, in corresponding Japanese Application No. 2006-515969.

* cited by examiner

Find common denominators

↓

Organize hierarchic multi-level structure

↓

Create a link between the first and second level

↓

Only one link to instrument above

↓

Amendments are inherited downwards

↓

Place templates on the first level

↓

Place "real" instruments on lower levels

↓

Give templates one link upwards but unlimited downwards

Fig 4

Find an existing instrument which has at least all of the attributes of the new instrument
Place the new instrument on a level below the existing instrument
Create a link between the new instrument and the existing instrument
Fig 5

US 7,853,507 B2

METHOD FOR ORGANIZING FINANCIAL INSTRUMENTS IN A CSD-SYSTEM

TECHNICAL FIELD

The present application relates to a method for use in a so-called Central Securities Depository, commonly abbreviated as CSD, by means of which method financial instruments can be organized in the CSD-system. The invention also discloses a computerized system for carrying out the method.

BACKGROUND

Traditionally, centralized institutions have been used mainly for storing gold which belongs to different nations in the same location. When transferring assets from one nation to another, all that needs to be done is to simply transfer gold from the "pile" which belongs to the paying nation to the "pile" which belongs to the nation that is to receive the payment. The principles of centralized institutions greatly facilitates the processing of payments, and for this reason, there is an interest in using such centralized solutions for commodities other than gold, in principle for any kind of commodity or instrument that can be imagined in the financial market, e.g., bonds, shares, etc.

In such an "expanded" centralized system there would be a plethora of instruments. The gathering of all instruments in one place (physical or virtual) is advantageous for those using the system, e.g., issuers, investors, and the operator of the system. Such a system is referred to as a Centralized Securities Depository, abbreviated as CSD.

Each kind of financial instrument in such a system would be defined by attributes, which are specific for each individual instrument. According to contemporary solutions and systems, the attributes for each individual instrument comprised in a system are "hard coded". Due to, inter alia, the vast amount of instruments which the system needs to be able to handle, this "hard coding" makes the system difficult and cumbersome to handle, for example, due to the fact that new financial instruments can appear in existing markets, or when it is desired to adapt the system to new markets, or exchange information between the markets.

SUMMARY

There is thus a need for a method to add new instruments in an easy manner to an existing CSD-type system. The method should also facilitate making amendments to existing instruments in the system.

This need is met by the present method for organizing financial instruments in a CSD-system where the instruments can be traded. Attributes are assigned to the instruments which define the instruments. The instruments are organized in a hierarchic multi-level structure as follows:
 a link is created between a first instrument on a first level in the hierarchy and instruments on a second, lower level in the hierarchy,
 the link between the instruments on the first and second levels of the hierarchy is defined by the fact that all of the attributes which are comprised in the instruments on the second level are also comprised in the instrument on the first level to which the instruments on the second level is linked.

Preferably, each instrument is only linked to one other instrument on a level above it. Any amendment to an attribute in an instrument causes the same amendment in the same attribute of those instruments which are linked to the amended instruments and which are on lower levels in the hierarchy than the amended instrument. In this way, amendments to existing instruments are greatly facilitated, since amendments need only be made on the highest level common to the instruments which are to be amended, and the amendment will then "trickle down" to the instruments in question.

The technology greatly facilitates the adding of new instruments to the system. When there is a need or desire to add a new instrument to the system, an existing instrument in the CSD-system is found which has at least all of the attributes of the instrument to be added. The new instrument is then placed on a level in the hierarchy of the system which is below said existing instrument, and a link is created between the instrument to be added and the existing instrument.

A computerized CSD-system is described, which comprises a register of instruments. The register is organized along the principles described above.

BRIEF DESCRIPTION OF THE DRAWINGS

FIGS. 4 and 5 show flowcharts.

DETAILED DESCRIPTION

In a CSD-system where various financial instruments are traded, the instruments are defined by attributes. Examples of attributes include the identity of the issuer of the instrument in question, the ISIN code, or some other code which identifies the instrument, e.g., CUSIP, the date of issue of the security, the interest rate, etc.

In addition to the objectives described above, additional desirable objectives for instruments in the register of a CSD-like system include:
 re-using different attributes between different instruments, and
 deriving one instrument from another instrument A multi-level hierarchical system is provided for organizing a register of financial instruments in a CSD-system. The number of levels preferably is not restricted by an upper limit.

Figure 1:
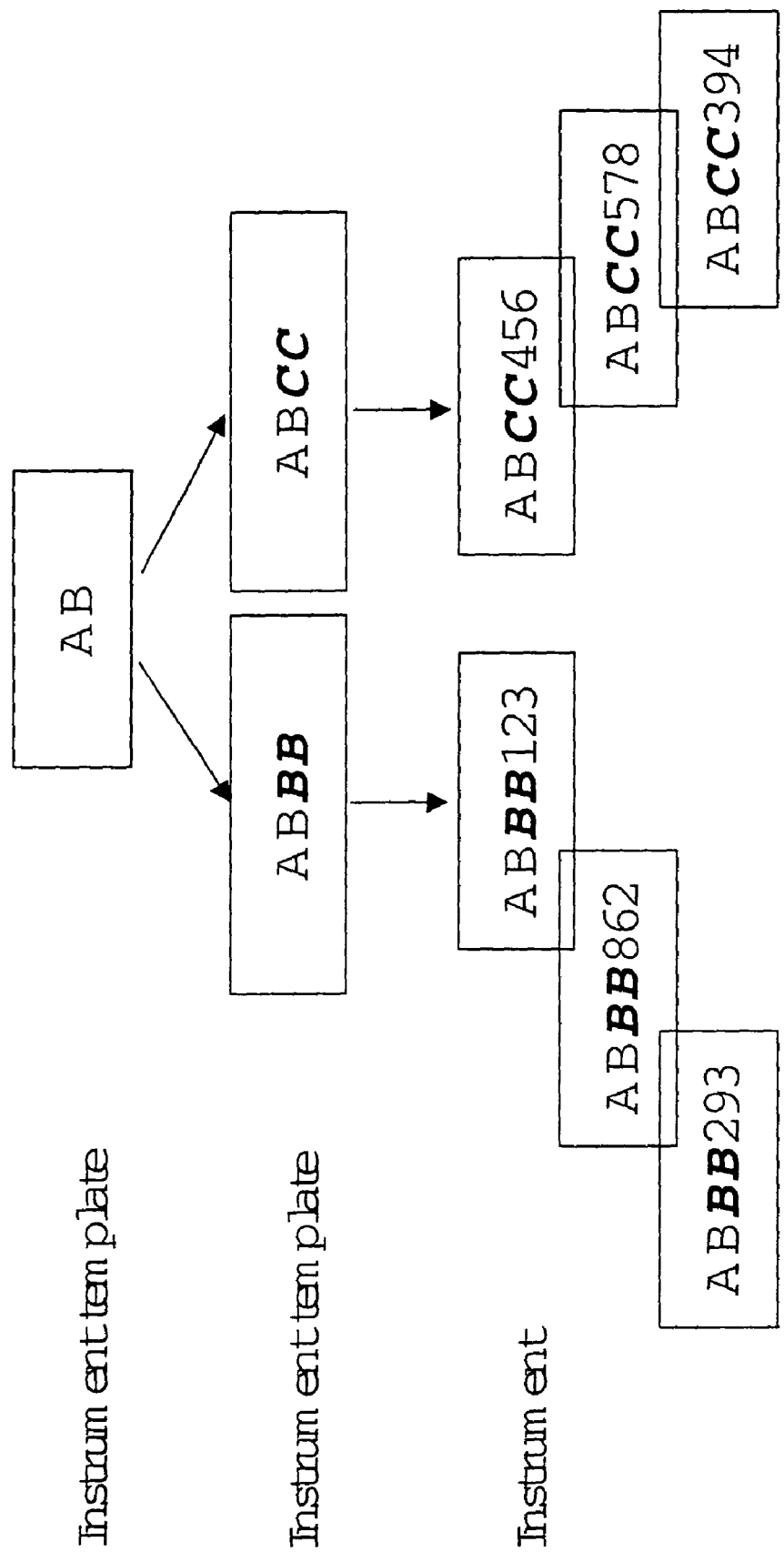
FIG. 1 shows one of the principles behind the technology.

With reference to FIG. 1, one of the principles of a multi-level hierarchy will now be explained. In FIG. 1, a group of instruments is shown arranged in a multi-level hierarchy. Instruments on a higher level (AB) can have links to several instruments on the lower levels (ABBB, ABCC). Each instrument preferably only has one link to the level above its own.

The instruments (AB) at the top level of the hierarchy are suitably not instruments which can be traded as such, but are rather generic "templates" for the instruments on the lower levels (ABBB, ABCC; ABBB123, ABCC456) that are "real" instruments that can be traded, e.g., government bonds or mortgage-backed securities and shares. A template in a system organized can either serve as a template on the next level, or as a template for an instrument on the next level. Although FIG. 1 only shows one group of instruments, the system can comprise a virtually unlimited number of such groups.

As can be seen from the group shown in FIG. 1, one of the principles behind the technology is that any instrument on any level of the system "inherits" all of the attributes of the instrument to which it is linked on the level immediately above it. This principle could in fact be said to essentially be the definition of the links between the instruments. Due to this linkage principle, when there is a need or desire for making amendments to one or more instruments, all that needs to be done is to locate, within the hierarchy, the attribute which is to be changed. When the attribute is amended, that particular amendment will "trickle down" to the linked instruments.

When organizing the group in FIG. 1, the following steps could be used:

Look at the real instruments (ABBB123, ABBB862, ABBB293; ABCC456, ABCC578, ABCC394) which are to be comprised in the register of the CSD-system.

Find a first set of common denominators (ABBB, ABCC) between the instruments.

Find a second set of common denominators (AB) between the first set of common denominators.

When all (or a preset number) of common denominators have been found, create a linked multi-level hierarchy according to the principles outlined above, with the instrument of the most basic common denominator at the highest level, and the real instruments at the lower levels.

The steps described above are also outlined in the accompanying flowchart in FIG. 4.

If, at a later stage, a new instrument needs to be added to the register, the following steps could be used:

find an existing instrument in the CSD-system which has at least all of the attributes of the instrument which is to be added, place the instrument which is to be added on a level in the hierarchy of the system which is below said existing instrument, create a link between the instrument to be added and the existing instrument.

These three steps are also outlined in the accompanying flowchart in FIG. 5.

Figure 2:
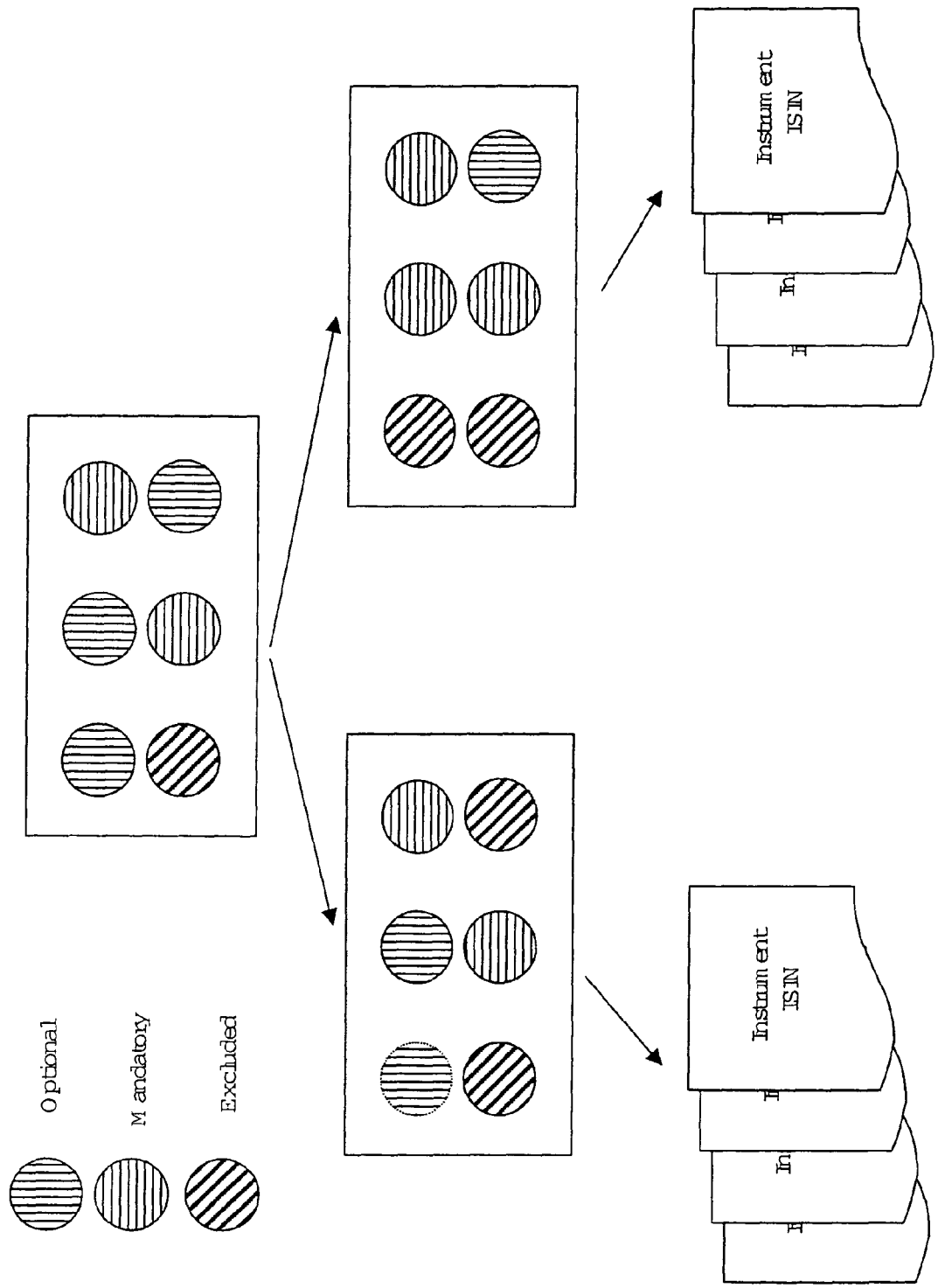
FIG. 2 shows a method.

FIG. 2 shows another feature: inheriting of an attribute from a higher level to a lower level in the hierarchy is made either optional, mandatory, or excluded, i.e., prohibited. The "setting up" of which principle of inheritance that is to be used for each instrument and attribute within the system is suitably carried out by the operator of the system, in a manner which best suits each instrument and the system as a whole.

Naturally, all attributes can be made mandatory to inherit according to the principle of linkage explained previously, but the principle of FIG. 2 additionally enhances the ease of handling. As shown in FIG. 2, the template instrument at the highest level in the hierarchy comprises six attributes, three of which are optional (shown vertically striped), two of which are mandatory (shown horizontally striped) and one of which is excluded from inheritance (diagonal stripes). Thus, the attributes, which were mandatory for inheritance to the next level, appear in the instruments on the level below the highest level, and the attribute that was excluded from being inherited is also marked as excluded in the second level.

However, the attributes which were optional from the first level to the second may have different properties of inheritance when going from the second level to the third level in the hierarchy. This is indicated in FIG. 2 by virtue of the fact that in one of the instruments on the second level, one of the optional attributes is now marked as being excluded (diagonal stripes) when going to the next (third) level, and in the other instrument on the second level one of the optional attributes from the first level is marked as mandatory (horizontal stripes) for inheritance to the next level and one is marked as excluded (diagonal stripes).

Figure 3:
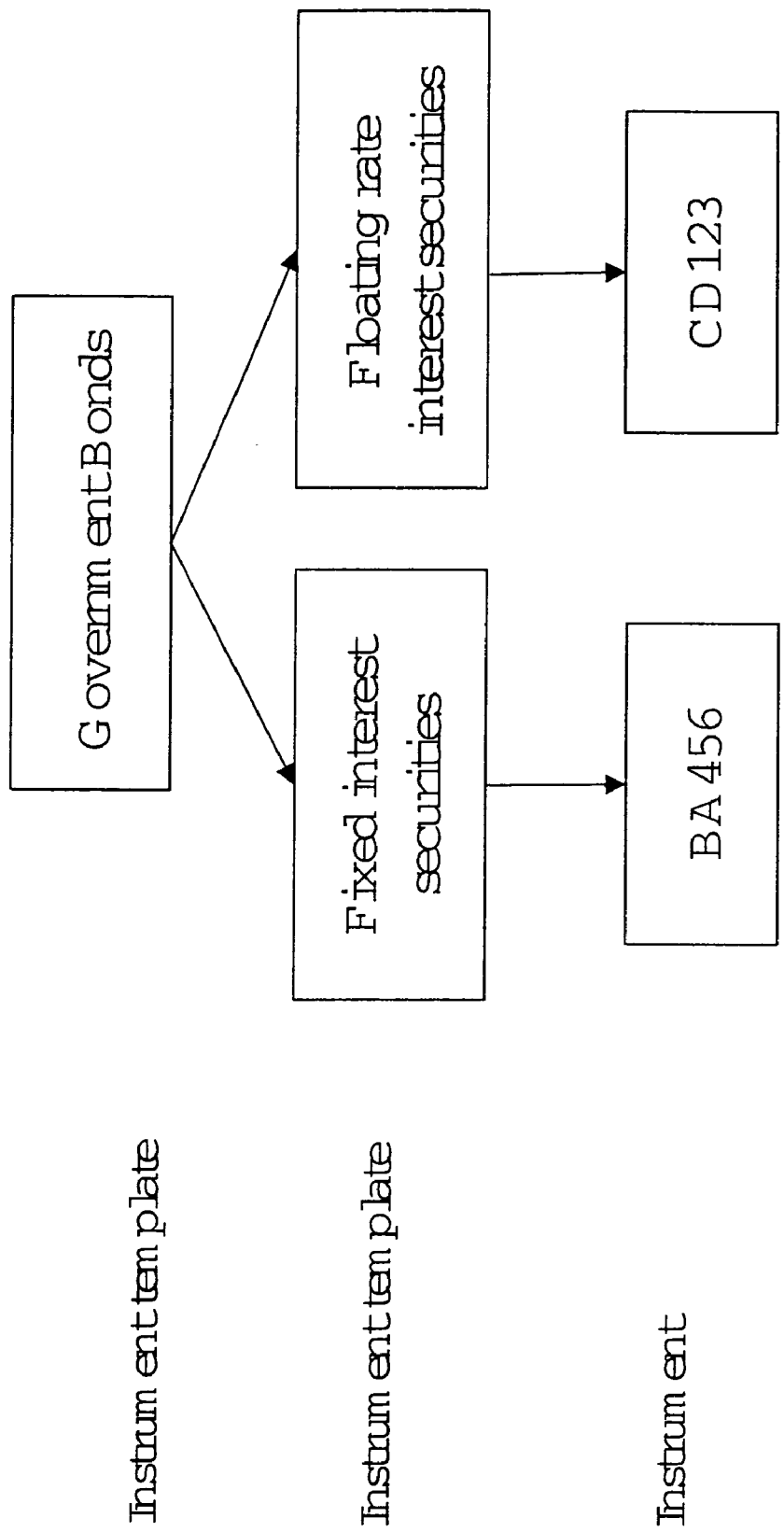
FIG. 3 shows an example of the method.

In FIG. 3, an example applied to real instruments is shown:

A group of instruments is organized in three levels. At the top level, there is an instrument template known as "Government bonds". The exact attributes of that template will not be enumerated here, as they should be well known to those working in the field. However, one attribute which Government Bonds have is that they generate an interest. In this particular case, interest can be generated in two ways: fixed or floating. Thus, at the top level, the template is provided with two attributes: one for fixed interest and one for floating interest.

On the next level, there are two templates, one for each of the more specific cases of bonds, which have fixed interest rates, and bonds with floating interest rates. One of these templates will inherit the attribute "fixed interest" and the other template will inherit the attribute "floating rate". This is done by both of the interest attributes (fixed and floating) at the top level being designated as optional for the next level, i.e., the second level. Then, on the second level, in the template for fixed interest bonds the attribute for "floating interest" will be designated as excluded from the following levels. In a corresponding manner, the template for floating rate bonds will exclude the attribute "fixed interest" from the following levels.

In addition to having a characteristic property, for example, fixed or floating interest, an attribute can also have a value. By way of example, in the case of the attribute being "interest," the value could be the interest rate.

In order to make the system even more flexible and easy to organize, the inheriting of the value of an attribute from a higher level to a lower level can also be made mandatory or optional regardless of whether the attribute was optional or mandatory to inherit. How a value is to be inherited would be set by, for example, the operator of the system.

If the inheritance of the attribute is mandatory and the inheritance of the value is optional, the instrument inherits a value as an example for the attribute (e.g., interest). A value needs to be set for the attribute in question since the attribute, i.e., the interest rate, is mandatory. The value could be either the inherited ("example") value, or a new defined value. Naturally, other ways of setting a value could not be used, for example, using some kind of automated information retrieval system. If the inheritance of the interest attribute is optional, and that option is chosen, the interest needs to be set, which can suitably be done in the manner just described.

The invention claimed is:

1. A computerized Centralized Securities Depository (CSD)-system comprising:

a CSD memory including a register structure of a plurality of financial instruments and financial instrument templates, each of which is defined by attributes, and each attribute has an associated one of plural inheritance characteristics, a CSD computer coupled to the CSD memory that configures the financial instruments and financial instrument templates in a hierarchical, multi-level structure based on the attributes and their associated inheritance characteristics such that a financial instrument or a financial instrument template on one level in a hierarchy is defined by selectively inheriting, dependent upon the associated inheritance characteristics of the attributes, the attributes of a financial instrument template on a next higher level in the hierarchy, wherein the CSD computer is arranged to link each financial instrument to a financial instrument template on the next higher level in the hierarchy, and wherein a highest level in the hierarchy includes financial instrument templates that cannot be traded within the CSD-system and financial instrument templates on lower levels in the hierarchy are also financial instruments which can be traded within the CSD-system.

2. The system of claim 1, wherein an amendment to an attribute in a financial instrument or a financial instrument template will cause the same amendment in the same attribute of those financial instruments or financial instrument templates which are linked to the amended financial instrument or the amended financial instrument template, and which are on the lower levels in the hierarchy than the amended financial instrument or the amended financial instrument template.

3. The system of claim 1, in which the financial instruments on the next higher level in the hierarchy are also the financial instrument templates.

4. The system of claim 1, in which the financial instrument templates in the hierarchy are only allowed one link to a hierarchical level above their own hierarchical level, but more than one link to hierarchical levels below their own hierarchical level.

5. The system of claim 1, wherein the plural inheritance characteristics include a mandatory, an optional, and an exclude inheritance characteristics, and wherein the mandatory inheritance characteristic means that the associated attribute must be inherited by the financial instrument or the financial instrument template on one level in the hierarchy from the financial instrument template on the next higher level in the hierarchy, the optional inheritance characteristic means that the associated attribute may be inherited by the financial instrument or the financial instrument template on one level in the hierarchy from the financial instrument template on the next higher level in the hierarchy, and the exclude inheritance characteristic means that the associated attribute shall not be inherited by the financial instrument or the financial instrument template on one level in the hierarchy from the financial instrument template on the next higher level in the hierarchy.

6. The system of claim 1, wherein each of at least some of the attributes has an associated value that may be inherited at the one level in the hierarchy along with its associated attribute.

7. The system of claim 6, wherein each attribute value has an associated inheritance characteristic, and wherein inheritance of each attribute value to a next lower level in the hierarchy depends on its associated inheritance characteristic.

8. A method comprising:
   providing financial instruments and financial instrument templates for safekeeping in a computer-implemented Centralized Securities Depository (CSD)-system that includes a CSD computer,
   defining, by the CSD computer, each of the financial instruments and each of the financial instrument templates by attributes, where each attribute has an associated one of plural inheritance characteristics,
   configuring, by the CSD computer, the financial instruments and financial instrument templates together in a hierarchical, multi-level structure based on the attributes and their associated inheritance characteristics,
   defining, by the CSD computer, a financial instrument or financial instrument template on one level in the hierarchy by selectively inheriting, dependent upon the associated inheritance characteristics of the attributes, the attributes of a financial instrument template on a next higher level in the hierarchy, and
   linking, by the CSD computer, each financial instrument to a financial instrument template on the next higher level in the hierarchy,
   wherein a highest level in the hierarchy includes financial instrument templates that cannot be traded within the CSD-system and financial instrument templates on lower levels in the hierarchy are also financial instruments which can be traded within the CSD-system.

9. The method of claim 8, wherein an amendment to an attribute in a financial instrument or a financial instrument template will cause the same amendment in the same attribute of those financial instruments or financial instrument templates which are linked to the amended financial instrument or the amended financial instrument template, and which are on the lower levels in the hierarchy than the amended financial instrument or the amended financial instrument template.

10. The method of claim 8, wherein the financial instruments placed on the next higher level in the hierarchy are financial instrument templates on a lower level in the hierarchy.

11. The method of claim 8, wherein the financial instrument templates in the hierarchy having only one link to a level above their own level can have more than one link to levels below their own level.

12. The method of claim 8, wherein a financial instrument is added to the CSD-system using the steps of:
   finding an existing financial instrument or a financial instrument template in the CSD-system which has all of the attributes of the financial instrument which is to be added,
   placing the financial instrument which is to be added on a level in the hierarchy which is below the existing financial instrument or the financial instrument template, and
   creating a link between the financial instrument to be added and the existing financial instrument or the financial instrument template.

13. The method of claim 8, wherein the plural inheritance characteristics include a mandatory, an optional, and an exclude inheritance characteristics, and wherein the mandatory inheritance characteristic means that the associated attribute must be inherited by the financial instrument or the financial instrument template on one level in the hierarchy from the financial instrument template on the next higher level in the hierarchy, the optional inheritance characteristic means that the associated attribute may be inherited by the financial instrument or the financial instrument template on one level in the hierarchy from the financial instrument template on the next higher level in the hierarchy, and the exclude inheritance characteristic means that the associated attribute shall not be inherited by the financial instrument or the financial instrument template on one level in the hierarchy from the financial instrument template on the next higher level in the hierarchy.

14. The method of claim 8, wherein each of at least some of the attributes has an associated value that may be inherited at the one level in the hierarchy along with its associated attribute.

15. The method of claim 14, wherein each attribute value has an associated inheritance characteristic, and wherein inheritance of each attribute value to a next lower level in the hierarchy depends on its associated inheritance characteristic.

* * * * *